(12) United States Patent
Xiao et al.

(10) Patent No.: US 12,277,953 B2
(45) Date of Patent: Apr. 15, 2025

(54) SPEECH SIGNAL PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Wei Xiao, Guangdong (CN); Meng Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 682 days.

(21) Appl. No.: 17/581,537

(22) Filed: Jan. 21, 2022

(65) Prior Publication Data
US 2022/0148613 A1    May 12, 2022

Related U.S. Application Data

(63) Continuation of application No. PCT/CN2020/097434, filed on Jun. 22, 2020.

(30) Foreign Application Priority Data

Jan. 20, 2020  (CN) .......................... 202010065853.9

(51) Int. Cl.
*G10L 21/034*  (2013.01)
*G10L 15/06*   (2013.01)
(Continued)

(52) U.S. Cl.
CPC .......... *G10L 21/034* (2013.01); *G10L 15/063* (2013.01); *G10L 25/18* (2013.01); *G10L 25/30* (2013.01)

(58) Field of Classification Search
CPC ..... G10L 21/034; G10L 15/063; G10L 25/18; G10L 25/30
See application file for complete search history.

(56) References Cited

U.S. PATENT DOCUMENTS

2007/0219785 A1    9/2007  Gao
2018/0366138 A1*  12/2018  Ramprashad ....... G10L 21/0208

FOREIGN PATENT DOCUMENTS

CN    101477800 A    7/2009
CN    101770775 A    7/2010
(Continued)

OTHER PUBLICATIONS

International Search Report issued Oct. 20, 2020 in International Patent Application No. PCT/CN2020/097434 (with English translation), 6 pages.
(Continued)

*Primary Examiner* — Bhavesh M Mehta
*Assistant Examiner* — Edward Tracy, Jr.
(74) *Attorney, Agent, or Firm* — ArentFox Schiff LLP

(57) ABSTRACT

Embodiments of this disclosure provide a speech signal processing method and apparatus, an electronic device, and a non-transitory computer-readable storage medium. A processing circuitry of the electronic device obtains speech feature parameters of a to-be-processed speech signal. The speech feature parameters include an initial spectrum of the to-be-processed speech signal. The processing circuitry predicts a first quantity of subband spectrum envelopes based on the speech feature parameters. The first set quantity is less than a quantity of initial spectrum coefficients included in the initial spectrum. Each of the subband spectrum envelopes corresponds to a second quantity of initial spectrum coefficients. The processing circuitry adjusts the initial spectrum based on the predicted subband spectrum envelopes to obtain an adjusted spectrum. The processing circuitry (Continued)

obtains an enhanced speech signal corresponding to the to-be-processed speech signal based on the adjusted spectrum. Apparatus and non-transitory computer-readable storage medium counterpart embodiments are also contemplated.

18 Claims, 3 Drawing Sheets

(51) Int. Cl.
*G10L 25/18* (2013.01)
*G10L 25/30* (2013.01)

(56) References Cited

FOREIGN PATENT DOCUMENTS

| | | |
|---|---|---|
| CN | 103258539 A | 8/2013 |
| CN | 108198564 A | 6/2018 |
| WO | WO-2019081070 A1 * 5/2019 | ............. G06N 20/10 |

OTHER PUBLICATIONS

Written Opinion issued Oct. 21, 2020 in International Patent Application No. PCT/CN2020/097434, 3 pages.

* cited by examiner

SPEECH SIGNAL PROCESSING METHOD AND APPARATUS, ELECTRONIC DEVICE, AND STORAGE MEDIUM

RELATED APPLICATIONS

This application is a continuation of International Application No. PCT/CN2020/097434, entitled "SPEECH SIGNAL PROCESSING METHOD AND APPARATUS, ELECTRONIC DEVICE, AND STORAGE MEDIUM" and filed on Jun. 22, 2020, which claims priority to Chinese Patent Application No. 202010065853.9, entitled "SPEECH SIGNAL PROCESSING METHOD AND APPARATUS, ELECTRONIC DEVICE, AND STORAGE MEDIUM" and filed on Jan. 20, 2020. The entire disclosures of the prior applications are incorporated herein by reference in their entirety.

FIELD OF THE TECHNOLOGY

This disclosure relates to the field of signal processing technologies including a speech signal processing method and apparatus, an electronic device, and a storage medium.

BACKGROUND OF THE DISCLOSURE

After an entire link of an original audio from acquisition, compression, transmission, decoding, to playback is completed, the quality of the audio may be attenuated. Without consideration of acoustic interferences (such as noise, reverberation, and echo) on the acquisition side and the playback side, main factors that cause the quality attenuation of the audio include, but are not limited to: a quantization error caused by compression, a transmission problem, an error introduced by transcoding between different encoders, and the like.

Therefore, to ensure the audio quality, the signal optimization needs to be performed at an important transmission node (for example, a downstream client) of a speech signal. At present, a commonly used method is to perform some post-processing optimizations on the speech signal in a time domain or a frequency domain, to optimize the speech signal, but the related speech signal optimization method needs to be further improved.

SUMMARY

Embodiments of this disclosure provide a speech signal processing method and apparatus, an electronic device, and a non-transitory computer-readable storage medium that can effectively improve the quality of speech signals. Solutions provided in the embodiments of this disclosure are as follows.

According to an aspect, the embodiments of this disclosure provide a speech signal processing method. In the method, speech feature parameters of a to-be-processed speech signal are obtained. The speech feature parameters include an initial spectrum of the to-be-processed speech signal. A first quantity of subband spectrum envelopes is predicted based on the speech feature parameters. The first quantity is less than a quantity of initial spectrum coefficients included in the initial spectrum. Each of the subband spectrum envelopes corresponds to a second quantity of initial spectrum coefficients. The initial spectrum is adjusted based on the predicted subband spectrum envelopes to obtain an adjusted spectrum. An enhanced speech signal corresponding to the to-be-processed speech signal is obtained based on the adjusted spectrum.

According to another aspect, the embodiments of this disclosure further provide a speech signal processing apparatus. Processing circuitry of the apparatus obtains speech feature parameters of a to-be-processed speech signal. The speech feature parameters include an initial spectrum of the to-be-processed speech signal. The processing circuitry predicts a first quantity of subband spectrum envelopes based on the speech feature parameters. The first quantity is less than a quantity of initial spectrum coefficients included in the initial spectrum. Each of the subband spectrum envelopes corresponds to a second quantity of initial spectrum coefficients. The processing circuitry adjusts the initial spectrum based on the predicted subband spectrum envelopes to obtain an adjusted spectrum. The processing circuitry obtains an enhanced speech signal corresponding to the to-be-processed speech signal based on the adjusted spectrum.

According to still another aspect, the embodiments of this disclosure further provide an electronic device, including a memory and a processor, the memory being configured to store a computer program, and the processor being configured to, when executing the computer program stored in the memory, perform the speech signal processing method provided in the embodiments of this disclosure.

According to another aspect, the embodiments of this disclosure further provide a non-transitory computer-readable storage medium storing instructions, which when executed by at least one processor cause the at least one processor to perform: obtaining speech feature parameters of a to-be-processed speech signal, the speech feature parameters including an initial spectrum of the to-be-processed speech signal; predicting a first quantity of subband spectrum envelopes based on the speech feature parameters, the first quantity being less than a quantity of initial spectrum coefficients included in the initial spectrum, and each of the subband spectrum envelopes corresponding to a second quantity of initial spectrum coefficients; adjusting the initial spectrum based on the predicted subband spectrum envelopes to obtain an adjusted spectrum; and obtaining an enhanced speech signal corresponding to the to-be-processed speech signal based on the adjusted spectrum.

In the solutions provided in the embodiments of this disclosure, by mapping a relatively large quantity of speech feature parameters of a speech signal to a relatively small quantity of signal adjustment parameters, that is, predicting subband spectrum envelopes with a quantity less than a quantity of initial spectrum coefficients based on the speech feature parameters, and implementing a gain control on an initial spectrum based on the relatively small quantity of subband spectrum envelopes, a quick optimization of the quality of the to-be-processed speech signal is achieved, and the quality of the obtained speech signal is improved. After the speech signal is processed by using the solutions provided in the embodiments of this disclosure, distortion (such as quantization noise distortion and distortion caused by signal transcoding) of the signal is obviously reduced.

BRIEF DESCRIPTION OF THE DRAWINGS

To describe the technical solutions in the embodiments of this disclosure more clearly, the following briefly describes the accompanying drawings required for describing the embodiments of this disclosure.

DESCRIPTION OF EMBODIMENTS

Figure 1:
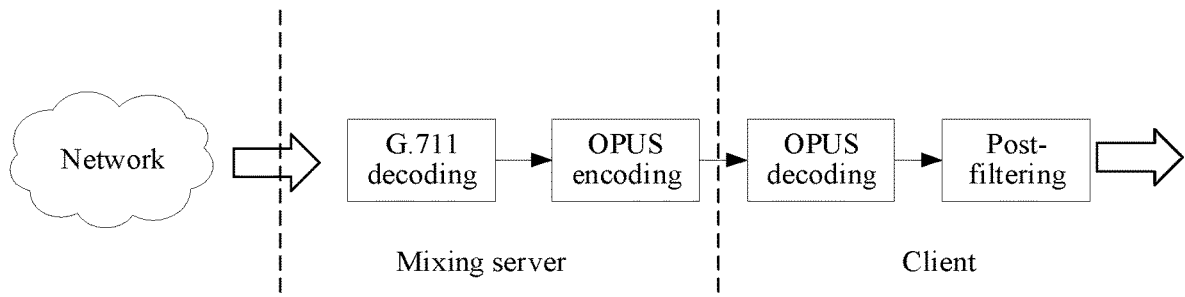
FIG. 1 to FIG. 3 are schematic diagrams of three application scenarios to which a solution provided in embodiments of this disclosure is applicable.

Embodiments of this disclosure are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret this disclosure and cannot be construed as a limitation to this disclosure.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of this disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To improve the quality of a speech signal, a downstream client (for example, a receiving end device) performs a post-filtering processing on a received speech signal in a time domain or a frequency domain. Related signal optimization solutions mainly perform specific adjustments on an uplink and downlink relationship of a reference speech signal in the time domain or the frequency domain. The processing is more of a linear operation, but various errors (for example, a quantization error caused by compression) that cause signal attenuation do not necessarily show a linear relationship. Therefore, the related signal optimization solutions still need to be improved.

Deep learning methods can provide a non-linear prediction capability. Therefore, performing a filtering process on speech signals based on the deep learning methods becomes possible. One method is to use regression, that is, to obtain a predicted spectrum that is infinitely close to an original spectrum (that is, the unattenuated spectrum) of an input spectrum by using a deep learning network. However, the related regression-based deep learning methods can have at least the following disadvantages.

(1) A large amount of training data is required for training.

(2) Many related methods are essentially regression mapping-based. That is, these related methods are based on an M-to-M mapping, where a quantity of input parameters is equal to a quantity of output parameters. When the regression mapping-based method is applied to speech signal processing, a direct mapping from spectrum to spectrum causes a relatively large quantity of generated model parameters and a low processing efficiency. Therefore, the regression mapping-based method cannot meet the real-time performance requirement of speech communication, especially an application requirement of a terminal side for real-time speech communication.

To resolve at least one of the foregoing technical problems in the related methods, the embodiments of this disclosure provide a speech signal processing method and apparatus, an electronic device, and a storage medium. The solutions provided in the embodiments of this disclosure are applicable to various application scenarios in which speech signal enhancement needs to be performed. For example, the application scenarios include, but are not limited to, an application scenario of intercommunication between Public Switched Telephone Network (PSTN) and Voice over Internet Protocol (which may be referred to as PSTN-to-VoIP), an application scenario of intercommunication between VoIP and PSTN (which may be referred to as VoIP-to-PSTN), an application scenario of intercommunication between VoIP and VoIP (which may be referred to as VoIP-to-VoIP), and the like.

In addition, in different application scenarios, nodes configured to perform the speech signal processing method (that is, nodes in a speech signal transmission link) may also be set according to different application requirements. For example, in the PSTN-to-VoIP application scenario, the method may be deployed at a destination node of the speech signal, that is, a receiving end device of the speech signal, and the receiving end device performs speech enhancement on the received speech signal. The method may alternatively be deployed at another node of the transmission link, or the method may be deployed at a plurality of nodes of the transmission link.

Applications of the speech signal processing method provided in the embodiments of this disclosure are exemplarily described below by using a VoIP conference system as an example with reference to three different application scenarios.

Application Scenario 1 (PSTN-to-VoIP)

In the application scenario, the speech signal processing method provided in the embodiments of this disclosure may be deployed on a client on a VoIP side, that is, a destination client (which is usually referred to as a downstream client).

FIG. 1 is a schematic diagram of some transmission modes in a transmission link of a speech signal in the application scenario example. FIG. 1 shows a mixing server and a destination client in the application scenario in detail. In the application scenario, VoIP has flexible customization features, and PSTN is a public network, and generally uses public standards such as ITU-T G.711/G.722 (where the G.711 standard is used as an example in FIG. 1) to encode and transmit acquired audio signals (that is, speech signals). When the public network intercommunicates with the VoIP, a transcoding process is performed to convert an encoding manner used by the PSTN to an encoding manner commonly used by the VoIP (such as OPUS encoding). One typical transcoding example is G.711-to-OPUS transcoding. The mixing server may transcode a code stream encoded by using the G.711 standard into a code stream encoded by using the OPUS standard. That is, as shown in FIG. 1, the mixing server performs G.711 decoding on a code stream encoded by using the G.711 standard that is transmitted from a PSTN link, then performs OPUS encoding on decoded speech frames, and transmits a code stream obtained through the encoding to a downstream client. After receiving the code stream encoded by using the OPUS, the downstream client performs OPUS decoding to obtain corresponding speech frames. In addition, the downstream client may alternatively respectively perform signal enhancement (post-filtering shown in the figure) on the speech frames by using the solution provided in the embodiments of this disclosure, to obtain an enhanced speech signal. The downstream client may be referred to as a client in this application scenario.

In terms of application effects, deploying post-filtering at a last node of the downstream client for signal enhancement can effectively improve the quality of the speech signal when there is basically no additional operation.

Application Scenario 2 (VoIP-to-PSTN)

In the application scenario, the speech signal processing method provided in the embodiments of this disclosure may be deployed in a mixing server. In this example, the G.711 standard and the OPUS standard are still used as an example for description.

Figure 2:
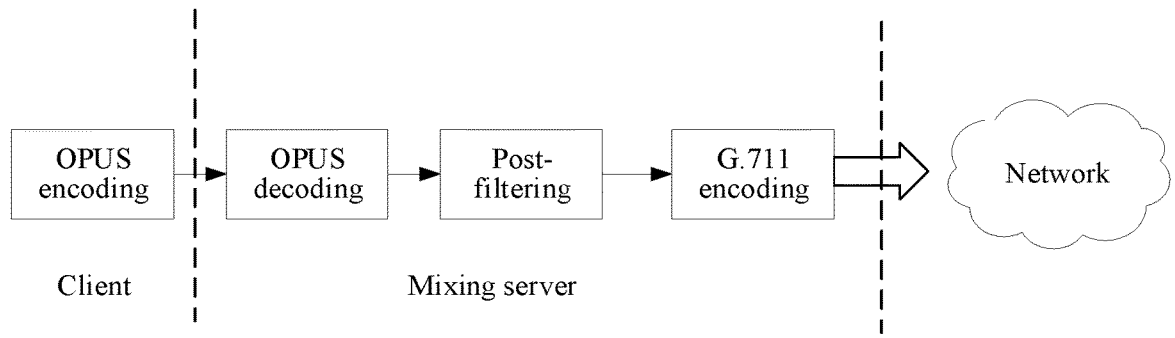

In an exemplary application, considering that the operability of a PSTN phone is not high, for a VoIP-to-PSTN channel, related post-filtering enhancement may be performed during the transcoding of the mixing server. FIG. 2 is a schematic diagram of some transmission modes in a transmission link of a speech signal in the application scenario. The figure shows a sending client (that is, a client on a VoIP side) and a mixing server. Specifically, OPUS decoding may be performed on a code stream encoded by using the OPUS that is sent from the client on the VoIP side in the mixing server, and post-filtering enhancement may be performed by using the speech signal processing method provided in the embodiments of this disclosure, thereby providing a code stream input with a higher signal quality for the G.711 encoding performed subsequently. That is, the mixing server may perform G.711 encoding on an enhanced speech signal, and send an encoded code stream to a destination client. The destination client can obtain the enhanced speech signal through G.711 decoding. In this application scenario, post-filtering is deployed in the mixing server, thereby improving the quality of the speech signal obtained through decoding on the PSTN side.

Application Scenario 3 (VoIP-to-VoIP)

Figure 3:
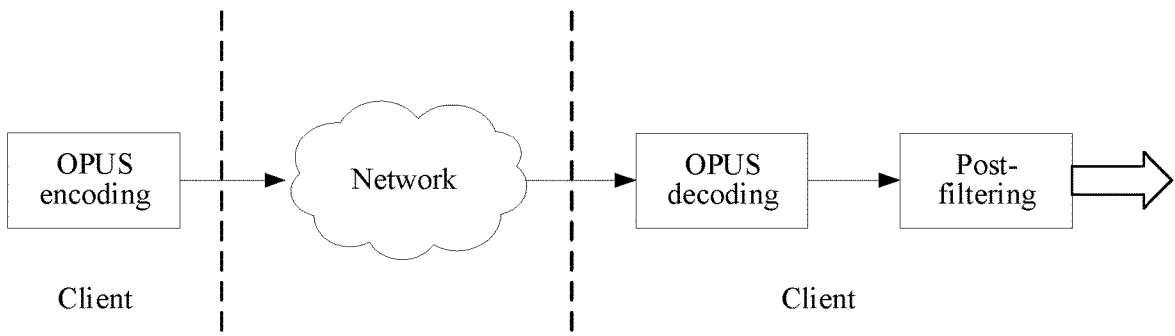

When a speech signal is encoded and decoded by using the OPUS standard in an entire transmission link, a scenario to which the speech signal processing method is applicable is an application scenario of OPUS intercommunication. Transmission and processing of speech signals in the application scenario are relatively simple. FIG. 3 is a schematic diagram of some transmission modes in a transmission link in the application scenario. The speech signal processing method (post-filtering shown in the figure) provided in the embodiments of this disclosure may be directly deployed on a downstream client, to enhance a speech signal for a quantization distortion error and then output the speech signal. That is, after receiving a code stream encoded by using the OPUS standard, the downstream client performs OPUS decoding on the code stream to obtain corresponding speech frames, and performs speech enhancement on the speech frames by using the method provided in the embodiments of this disclosure, to obtain an enhanced speech signal.

The following describes the technical solutions of this disclosure and how to resolve the foregoing technical problems according to the technical solutions of this disclosure in detail by using specific embodiments. The following several specific embodiments may be combined with each other, and the same or similar concepts or processes may not be described repeatedly in some embodiments. The following describes the embodiments of this disclosure with reference to the accompanying drawings.

Figure 4:
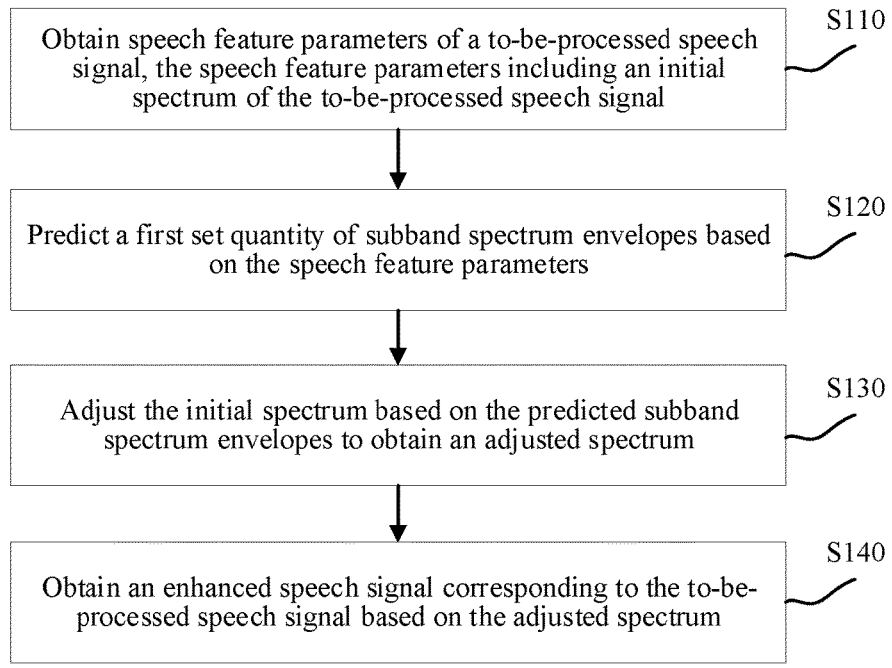
FIG. 4 is a schematic flowchart of a speech signal processing method according to an embodiment of this disclosure.

FIG. 4 is a schematic flowchart of a speech signal processing method according to an embodiment of this disclosure. The speech signal processing method is applicable to the foregoing three application scenarios, and is performed by a client or a mixing server in the three application scenarios. The client and the mixing server may be collectively referred to as an electronic device. As shown in FIG. 4, the method may include the following steps S110-S140.

In step S110, speech feature parameters of a to-be-processed speech signal are obtained. The speech feature parameters include an initial spectrum of the to-be-processed speech signal.

The to-be-processed speech signal is a speech signal of a current speech frame of multiple speech frames of a to-be-enhanced speech signal (that is, a signal requires speech enhancement). In other words, in an exemplary processing, a respective speech signal of each speech frame may be performed by using the solution provided in this embodiment. Correspondingly, the speech feature parameters are respective speech feature parameters of each speech frame.

Specifically, a time-frequency transform may be performed on the to-be-processed speech signal to obtain an initial spectrum which includes spectrum coefficients of the to-be-processed speech signal. Specific transform manners of the time-frequency transform may be selected according to application requirements, which may include, but are not limited to, a Fourier transform (FT), or a discrete cosine transform (DCT). For ease of description, in the following description of the embodiments of this disclosure, for the FT, a short-term Fourier transform (STFT) is used as an example for description; and for the DCT, a modified discrete cosine transform (MDCT) is used as an example for description. However, for a person skilled in the art, the specific manners of the time-frequency transform include, but are not limited to, an STFT and an MDCT. Other time-frequency transform manners are also applicable to the solution of the embodiments of this disclosure.

In an exemplary application, when an FT is used, the spectrum of the speech signal includes an amplitude spectrum and a phase spectrum. In this case, in the method provided in this embodiment, the speech feature parameters specifically include the amplitude spectrum of the spectrum. That is, for the to-be-processed speech signal, when an FT is used, the initial spectrum included in the speech feature parameters is specifically an amplitude spectrum of the to-be-processed speech signal, and the subsequent processing for the initial spectrum is correspondingly performed on the amplitude spectrum. When a DCT is used, the speech feature parameters are specifically transformed spectrum coefficients.

In step S120, a first quantity (or a first set quantity) of subband spectrum envelopes is predicted based on the speech feature parameters. The first quantity is less than a quantity of initial spectrum coefficients included in the initial spectrum, and each of the subband spectrum envelopes corresponds to a second quantity of initial spectrum coefficients.

In other words, in the step S120, a quantity of parameters of output data (that is, the predicted subband spectrum envelopes) is less than a quantity of parameters of input data (that is, the speech feature parameters), and each of the predicted subband spectrum envelopes corresponds to at least two initial spectrum coefficients.

In step S130, the initial spectrum is adjusted based on the predicted subband spectrum envelopes to obtain an adjusted spectrum.

In step S140, an enhanced speech signal corresponding to the to-be-processed speech signal is obtained based on the adjusted spectrum.

It can be learned from the foregoing description that when the time-frequency transform is an FT, in the foregoing processing steps, the processing is specifically performed on the amplitude spectrum of the initial spectrum. In this case, after the adjusted spectrum is obtained, to obtain the enhanced speech signal, the phase spectrum included in the spectrum of the speech signal further needs to be reconstructed. Therefore, a target phase spectrum needs to be obtained based on an initial phase spectrum of the to-be-processed speech signal. Then, the adjusted amplitude spectrum and the target phase spectrum are combined, and a time-frequency inverse transform is performed on a spectrum obtained through the combination, to obtain an enhanced speech signal in a time domain. When the time-frequency transform is a DCT, because the initial spectrum coefficients are DCT coefficients, after the adjusted spectrum is obtained, a time-frequency inverse transform is performed on the adjusted spectrum, and an enhanced speech signal in the time domain can be obtained.

In the speech signal processing method provided in this embodiment, a to-be-processed speech signal is enhanced based on speech feature parameters of the to-be-processed speech signal, by mapping a relatively large quantity of speech feature parameters of the speech signal to a relatively small quantity of signal adjustment parameters. Therefore, by predicting subband spectrum envelopes with a quantity less than a quantity of initial spectrum coefficients based on the speech feature parameters, and implementing a gain control on an initial spectrum based on the relatively small quantity of predicted subband spectrum envelopes, a quick optimization of the quality of the to-be-processed speech signal is achieved, and the quality of the obtained speech signal is improved. After the speech signal is processed by using the solutions provided in the embodiments of this disclosure, distortion (such as quantization noise distortion and distortion caused by signal transcoding) of the signal is obviously reduced.

In an embodiment, the speech feature parameters may further include time domain feature parameters of the to-be-processed speech signal.

To further improve the quality of the obtained enhanced speech signal, in the solution of the embodiments of this disclosure, when signal processing is performed on the speech signal, in addition to taking frequency domain feature parameters (that is, the foregoing initial spectrum) of the to-be-processed speech signal into consideration, time domain feature analysis may further be performed on the to-be-processed speech signal, and time domain feature parameters obtained through the analysis may be fused into the enhancement of the signal.

For the speech signal, the time domain feature parameters are parameters that can reflect time domain characteristics of the speech signal. In an exemplary application, parameters that are specifically used may be correspondingly configured according to different requirements.

In an embodiment, the time domain feature parameters may specifically include a line spectral frequency (LSF) parameter.

To better understand the LSF parameter, related description of the LSF parameter is first provided below.

The LSF parameter is a signal parameter in a linear prediction (LP) analysis technology in a speech communication system. The LP analysis is to define a p-order filter. The p-order filter may be represented as:

$$A_p(z)=1+a_1z^{-1}+a_2z^{-2}+\ldots+a_pz^{-p} \quad (1)$$

where z in the expression corresponds to a z transform, that is, the expression is an expression in a complex frequency domain, p is a quantity of orders of the filter, $a_i$ ($i=1, 2, \ldots, p$) represents an $i^{th}$-order filter coefficient.

When the p-order filter is used for performing LP filtering, a filtering result corresponding to each sample point (that is, a frequency domain sampling point) of a speech frame is obtained by convolving previous p historical sample points of the sample point and the p-order filter, which meets short-term correlation characteristics of the speech signal. In an exemplary application, a specific value of p may be configured according to an application requirement. For example, for an application scenario with a sampling rate of 8,000 Hz, the value of p may be 10. In another example, for an application scenario with a sampling rate of 16,000 Hz, the value of p is 16.

The foregoing polynomial expression (1) of the p-order filter may be further decomposed into the following expression:

$$A_p(z) = \frac{P(z) + Q(z)}{2} \quad (2)$$

where: $P(z)=A_p(z)-z^{-(p+1)}A_p(z^{-1})$, and $Q(z)=A_p(z)+z^{-(p+1)}A_p(z^{-1})$.

In terms of the physical meaning of the speech signal, the expressions P(z) and Q(z) respectively represent the quasi-periodical change rules of opening and closing of the glottis. Roots of the two polynomial decomposition forms P(z) and Q(z) appear alternately on a complex plane, and therefore are named as LSF. The roots of P(z) and Q(z) correspond to a series of angular frequencies distributed on a unit circle of the complex plane, and an $i^{th}$-order root of the p-order filter may be represented as $\omega_i$. Assuming that an $i^{th}$-order root of P(z) and Q(z) on the complex plane is defined as $\theta_i$, an angular frequency corresponding to the root may be defined as:

$$\omega_i = \tan^{-1}\left(\frac{\text{Re}\{\theta_i\}}{\text{Im}\{\theta_i\}}\right) \quad (3)$$

where $\text{Re}\{\theta_i\}$ represents a real part of $\theta_i$, and $\text{Im}\{\theta_i\}$ represents an imaginary part of $\theta_i$.

A corresponding statistical value of the LSF parameter may be calculated. For each speech frame, an LSF parameter of a speech signal of the speech frame may mainly include three parts. By using an $n^{th}$ speech frame as an example, an LSF parameter of the speech frame mainly includes the following three parts:

$$\text{Shift}(n) = \left\{\sum_{i=1}^{p} \omega_i(n-1)\right\} - \left\{\sum_{i=1}^{p} \omega_i(n)\right\} \quad (4)$$

$$\text{Bias}(n) = \frac{1}{p}\sum_{i=1}^{p} \omega_i(n) \quad (5)$$

$$\text{Dev}(n) = \sum_{i=1}^{p} (\omega_i(n) - \overline{\omega}_i)^{\beta} \quad (6)$$

where $$\overline{\omega}_i = \frac{i\pi}{p+1},$$

i=1 ... p. $\omega_i(n)$ represents an $i^{th}$-order angular frequency of the $n^{th}$ speech frame. $\beta$ is an adjustment coefficient.

In terms of the physical meaning, Shift(n) represents an angular frequency shift of a current speech frame relative to an adjacent speech frame of the current speech frame. In the foregoing expression, the adjacent speech frame is a previous speech frame of the current speech frame. That is, Shift(n) represents an angular frequency shift of the $n^{th}$ speech frame relative to an $(n-1)^{th}$ speech frame, and Shift represents an overall change situation of an angular frequency corresponding to the overall LSF over time.

The adjacent speech frame of the current speech frame may alternatively be a next speech frame of the current speech frame.

$$\text{Shift}(n) = \{\Sigma_{i=1}^{P}\omega_i(n)\} - \{\Sigma_{i=1}^{P}\omega_i(n+1)\} \quad (7)$$

The adjacent speech frame may alternatively be at least one previous speech frame and/or at least one next speech frame adjacent to the current speech frame. For example, the adjacent speech frames may be a last speech frame and a next speech frame of the current speech frame. In this case, Shift(n) may be an average value of calculation results of expression (4) and expression (7). Further, importance of an impact of the last speech frame and the next speech frame on the current speech frame may be considered, and different weights are given to the last speech frame and the next speech frame. In other words, the adjacent speech frame may be selected according to different application requirements.

Bias may be referred to as an average angular frequency. For the $n^{th}$ speech frame, Bias(n) represents an average angular frequency of the $n^{th}$ speech frame. The parameter is similar to an average value of the angular frequencies corresponding to the LSF. Deviation (Dev) may be referred to as a deviation of an angular frequency distribution of the current speech frame relative to a reference angular frequency distribution. The parameter is similar to a higher-order moment of the angular frequencies corresponding to the LSF. In other words, $\overline{\omega}_i(i=1 \ldots p)$ is a reference LSF distribution, and may alternatively be understood as a standard or defined LSF distribution. Dev reflects a difference between an LSF distribution of each speech frame and the standard LSF distribution. $\beta$ is the adjustment coefficient. If a value of $\beta$ is 2, Dev represents a Euclidean distance between the angular frequency distribution of the current speech frame and the reference angular frequency distribution; and if the value of $\beta$ is 1 or 3, an impact of a symbol is considered. When Dev is positive, it represents a relatively high-frequency distribution of the LSF. Otherwise, it represents a relatively low-frequency distribution of the LSF.

It can be learned that all the foregoing LSF parameters are parameters that can reflect time domain characteristics of the speech signal. For example, Shift reflects a fluctuation situation of the current speech frame relative to the adjacent speech frame of the current speech frame; Bias reflects a temporal fluctuation situation of the signal the current speech frame; and Dev reflects a deviation between the signal of the current speech frame and a reference signal. Therefore, the LSF parameters may be used as time domain feature parameters of the to-be-processed speech signal, and the time domain feature parameters and the frequency domain feature parameters are fused to enhance the to-be-processed speech signal, thereby further improving the quality of the signal.

In an embodiment, the to-be-processed speech signal is a to-be-processed speech signal of a current speech frame of multiple speech frames of a to-be-enhanced speech signal, and the LSF parameter of the current speech frame includes at least one of the following parameters:
  (i) an angular frequency shift of the current speech frame relative to an adjacent speech frame of the current speech frame;
  (ii) an average angular frequency of the current speech frame; or
  (iii) a deviation of an angular frequency distribution of the current speech frame relative to a reference angular frequency distribution.

In other words, for each speech frame, the LSF parameter thereof may include one or more of the foregoing Shift, Bias, and Dev.

In an embodiment, for the current speech frame, the LSF parameter includes the angular frequency shift (that is, Shift) of the current speech frame relative to the adjacent speech frame of the current speech frame and the average angular frequency (that is, Bias) of the current speech frame, or includes the angular frequency shift of the current speech frame relative to the adjacent speech frame of the current speech frame and a deviation (that is, Dev) of the angular frequency distribution of the current speech frame relative to the reference angular frequency distribution.

Because Shift, Bias, and Dev can all well reflect signal characteristics of the speech signal, physical characteristics of statistical values of the three parameters may be used for modeling, to obtain the time domain feature parameters of the speech signal, and extraction is performed on the time domain feature parameters to obtain a time domain feature vector. Characteristics of the speech signal that are reflected by Bias and Dev are relatively similar. Therefore, in an embodiment, one of Bias and Dev may be selected. For example, Bias or Dev may be selected as a time domain feature parameter. Alternatively, Bias and Dev may be both selected. In an exemplary application, a specific selection of one of more of the foregoing Shift, Bias, and Dev may be configured according to application requirements. This is not limited in the embodiments of this disclosure.

In an embodiment, each speech frame includes at least two subframes, and for one speech frame, an LSF parameter of the speech frame includes an LSF parameter of at least one subframe included in the speech frame.

In an exemplary application, when a speech signal is encoded, one speech frame is usually divided into several subframes. For example, a speech frame with a duration of 20 ms is usually divided into 2 to 4 subframes. In this case, an LSF parameter of one speech frame may specifically include an LSF parameter of at least one subframe included in the speech frame.

In an embodiment, the adjusting the initial spectrum based on the predicted subband spectrum envelopes to obtain the adjusted spectrum in step S130 includes:

dividing the initial spectrum into a first quantity of spectrum subbands, each of the spectrum subbands including the second quantity of initial spectrum coefficients in the initial spectrum;

obtaining a respective to-be-processed subband spectrum envelope for each spectrum subband based on the initial spectrum coefficients included in the respective spectrum subband;

determining a respective difference value for each of the predicted subband spectrum envelopes between the respective predicted subband spectrum envelope and a corresponding to-be-processed subband spectrum envelope; and adjusting the initial spectrum coefficients for each to-be-processed subband spectrum envelope based on the difference value corresponding to the respective to-be-processed subband spectrum envelope, to obtain the adjusted spectrum.

Specifically, after the first quantity (two or more) of subband spectrum envelopes are predicted based on the speech feature parameters, to adjust the initial spectrum coefficients in each initial spectrum, to-be-adjusted parameters of the initial spectrum coefficients need to be determined. Because each subband spectrum envelope corresponds to the second quantity of initial spectrum coefficients, the initial spectrum can be divided into the first quantity of spectrum subbands. A respective initial subband spectrum envelope, that is, the foregoing to-be-processed subband spectrum envelope or a to-be-adjusted subband spectrum envelope, is obtained based on the initial spectrum coefficients included in each spectrum subband. The to-be-adjusted subband spectrum envelopes have a one-to-one correspondence with the predicted subband spectrum envelopes. That is, each to-be-adjusted subband spectrum envelope and a corresponding predicted subband spectrum envelope correspond to the same initial spectrum coefficients. For example, the first to-be-adjusted subband spectrum envelope and the predicted first subband spectrum envelope both correspond to the first n initial spectrum coefficients in the initial spectrum. Subsequently, a respective difference value may be determined for each pair of to-be-adjusted subband spectrum envelope and predicted subband spectrum envelope. The respective difference value can be used as a to-be-adjusted parameter of initial spectrum coefficients included in the corresponding to-be-adjusted subband spectrum envelope. Based on the to-be-adjusted parameters of the initial spectrum coefficients, the initial spectrum coefficients can be adjusted to obtain an adjusted spectrum.

In an embodiment, both the predicted subband spectrum envelopes and the to-be-processed subband spectrum envelopes are envelopes in a logarithm domain. Correspondingly, for one to-be-processed subband spectrum envelope, the adjusting the initial spectrum coefficients for the to-be-processed subband spectrum envelope based on the difference value corresponding to the to-be-processed subband spectrum envelope specifically includes:

respectively performing a logarithmic transformation on each of the initial spectrum coefficients corresponding to the to-be-processed subband spectrum envelope, to obtain coefficients in the logarithm domain;

respectively performing a gain adjustment on each of the coefficients in the logarithm domain based on the difference value corresponding to the to-be-processed subband spectrum envelope, to obtain adjusted coefficients; and respectively performing an inverse logarithmic transformation on each of the adjusted coefficients, to obtain adjusted spectrum coefficients corresponding to the to-be-processed subband spectrum envelope.

In an exemplary application, in order to reduce the scale of variables and facilitate calculations without changing the properties and correlations of data, data in the logarithm domain is usually used for calculation. After a logarithm operation is performed, the data can be more stable. Therefore, the subband spectrum envelopes in this embodiment may be specifically envelope values in the logarithm domain. Correspondingly, when the gain adjustment of the initial spectrum coefficients is performed based on the foregoing difference value, the initial spectrum coefficients can be first transformed into coefficients in the logarithm domain, and then the adjustment is performed by using the corresponding difference value. In an embodiment, the logarithmic transformation may be alternatively not performed on the initial spectrum coefficients, but the inverse logarithmic transformation is performed on the foregoing difference values, and difference values obtained through the transformation are applied for corresponding initial spectrum coefficients, to implement the gain control on spectrum coefficients.

In an embodiment, the obtaining the speech feature parameters of the to-be-processed speech signal in step S110 includes:

performing a time-frequency transform on the to-be-processed speech signal to obtain the initial spectrum.

The time-frequency transform may include, but is not limited to, an FT or a DCT.

In an embodiment, when the time-frequency transform is an FT, the speech feature parameters include an initial amplitude spectrum of the initial spectrum, and the predicted subband spectrum envelopes are subband amplitude spectrum envelopes, so that the adjusting the initial spectrum based on the predicted subband spectrum envelopes to obtain the adjusted spectrum in step S130 may specifically include:

adjusting the initial amplitude spectrum based on the predicted subband amplitude spectrum envelopes to obtain an adjusted amplitude spectrum.

Correspondingly, the obtaining the enhanced speech signal corresponding to the to-be-processed speech signal based on the adjusted spectrum in step S140 includes:

obtaining a target phase spectrum based on an initial phase spectrum of the to-be-processed speech signal; and performing a time-frequency inverse transform based on the adjusted amplitude spectrum and the target phase spectrum to obtain the enhanced speech signal.

In other words, when the FT manner is used, the used frequency domain feature parameters may specifically include an amplitude spectrum. Correspondingly, the predicted subband spectrum envelopes are subband amplitude spectrum envelopes, and the adjusted spectrum obtained based on the envelopes is an adjusted amplitude spectrum. In this case, to obtain an enhanced speech signal, in addition to the adjusted amplitude spectrum, corresponding phase information further needs to be obtained, that is, to obtain a target phase spectrum based on the initial phase spectrum of the to-be-processed speech signal. After combining the adjusted amplitude spectrum and the target phase spectrum, and performing a frequency-time transform on a spectrum obtained through the combination, an enhanced speech signal in a time domain can be obtained.

In an embodiment, when the time-frequency transform is a DCT, the obtaining the enhanced speech signal based on the adjusted spectrum in step S140 includes:
 performing a time-frequency inverse transform on the adjusted spectrum, to obtain the enhanced speech signal.

In other words, when the time-frequency transform is a DCT, a frequency-time transform may be directly performed on the adjusted spectrum, to obtain an enhanced speech signal in the time domain.

The foregoing processing manner using the FT is only an example provided in the embodiments of this disclosure, and the processing manner is also applicable to processing of a time-frequency transform manner in which an amplitude spectrum and a phase spectrum are separated. Similarly, the foregoing processing manner corresponding to the DCT is also applicable to processing using other time-frequency transform manners in which an amplitude spectrum and a phase spectrum are fused.

In an embodiment, the predicting the first quantity of subband spectrum envelopes based on the speech feature parameters in step S120 includes:
 predicting the first quantity of subband spectrum envelopes based on the speech feature parameters by using a neural network.

The neural network is obtained through a training process that includes:
 obtaining training data, the training data including each to-be-enhanced sample speech signal and a pure speech signal corresponding to each sample speech signal;
 obtaining sample subband spectrum envelopes corresponding to each sample speech signal based on each pure speech signal;
 determining speech feature parameters of each sample speech signal; and
 training an initial neural network based on each sample speech signal until a loss function of the initial neural network converges, an input of the initial neural network being the speech feature parameters of each to-be-enhanced sample speech signal, and an output of the initial neural network being predicted subband spectrum envelopes corresponding to the respective to-be-enhanced sample speech signal, and a value of the loss function representing a difference between the predicted subband spectrum envelopes corresponding to each sample speech signal and the corresponding sample subband spectrum envelopes.

Specifically, in an exemplary application, training data may be sampled for training the neural network, so that the subband spectrum envelopes predicted by the neural network after the training and learning can be infinitely close to subband spectrum envelopes of a pure speech signal. The training data specifically includes each to-be-enhanced sample speech signal and a plurality of pure speech signals each respectively corresponding to a different to-be-enhanced sample speech signal. Subband spectrum envelopes that can be obtained based on a pure speech signal can be used as sample subband spectrum envelopes of a corresponding to-be-enhanced sample speech signal. For each to-be-enhanced sample speech signal, a respective input vector that needs to be input into the neural network is obtained. The respective input vector includes speech feature parameters of the corresponding to-be-enhanced sample speech signal. It may be understood that the speech feature parameters include frequency domain feature parameters (that is, a spectrum of the to-be-enhanced sample speech signal), and may further include time domain feature parameters (for example, an LSF parameter of the to-be-enhanced sample speech signal). In an exemplary application, speech feature parameters of a to-be-enhanced sample speech signal used during the training of the neural network are usually the same as speech feature parameters of the to-be-processed speech signal used when a to-be-processed speech signal is processed by using the trained neural network.

Each to-be-enhanced sample speech signal may be specifically a frame of speech signal. Each to-be-enhanced sample speech signal is a speech signal that needs to be enhanced, for example, a speech signal that is obtained by compressing an original speech signal by using a specified encoder and has quantization distortion; and a pure speech signal is an original speech signal having not been compressed.

During training, an input of the neural network can be speech feature parameters of a to-be-enhanced sample speech signal, and an output of the neural network can be predicted subband spectrum envelopes. The subband spectrum envelopes predicted by the neural network can be infinitely close to corresponding sample subband spectrum envelopes (that is, subband spectrum envelopes of a pure speech signal) through a continuous training. When a preset training ending condition is met, for example, when the foregoing described loss function converges, it can be considered that the neural network has learned good network parameters, and the training can be ended. The neural network obtained at this time is used as a neural network used for processing of a to-be-processed speech signal.

The specific network structure of the initial neural network is not limited in the embodiments of this disclosure, and may be selected according to an application requirement. For example, the network structure may include, but is not limited to, a convolutional neural network, recurrent neural network, or the like. A specific type of the loss function may also be selected according to an application requirement. This is not limited in the embodiments of this disclosure.

In an embodiment, for one pure speech signal, the obtaining the sample subband spectrum envelopes corresponding to a sample speech signal corresponding to the pure speech signal based on the pure speech signal includes:
 performing a time-frequency transform on the pure speech signal to obtain an initial spectrum of the pure speech signal;
 dividing the initial spectrum of the pure speech signal into a first quantity of spectrum subbands, each of the spectrum subbands including a second quantity of spectrum coefficients in the initial spectrum; and
 obtaining a respective sample subband spectrum envelope for each spectrum subband based on the spectrum coefficients included in the respective spectrum subband.

It may be understood that the principle of the manner of obtaining the sample subband spectrum envelopes is the same as that of obtaining the to-be-processed subband spectrum envelopes of the to-be-processed speech signal described above. Details are not described herein again.

In an embodiment, the neural network includes an input layer, a hidden layer, and an output layer that are sequentially cascaded. The hidden layer includes a long short-term memory (LSTM) layer and a fully-connected layer that are sequentially cascaded.

An input of the input layer is a first feature vector of the speech feature parameters.

The LSTM layer is configured to perform a feature extraction on the first feature vector processed by the input layer to generate a second feature vector.

The fully-connected layer is configured to perform the feature extraction on the second feature vector extracted from the LSTM layer to generate a third feature vector.

The output layer is configured to obtain an output vector with the first quantity of dimensions based on the third feature vector extracted by the fully-connected layer. Element values of elements in the output vector are the predicted subband spectrum envelopes.

In an embodiment, the neural network may have an LSTM-based network structure. The LSTM is a recurrent neural network. When the processing is performed based on the network structure provided in the embodiments of this disclosure, after a feature vector of the speech feature parameters (which may be referred to as an input vector) is input into the input layer, the input layer may transform the input vector into a vector with a quantity of dimensions, and input the vector into the LSTM layer. After the LSTM layer performs a feature extraction on the feature vector processed by the input layer, a latent vector with the same quantity of dimensions can be obtained. The latent vector is used as an input of a subsequent fully-connected layer (which may be one fully-connected layer or a plurality of cascaded fully-connected layer). After the fully-connected layer performs a feature transformation on the latent vector, an output feature vector is processed by the output layer, and a feature vector with the first quantity of dimensions is obtained. The feature vector output by the output layer includes correspondingly the predicted subband spectrum envelopes. Specifically, element values of elements in the output feature vector are corresponding envelope values of the predicted subband spectrum envelopes.

The speech signal processing method provided in this embodiment provides a parametrized regression prediction solution. In the solution, a network topology structure of M-to-N is established based on signal modeling, M representing a quantity of speech feature parameters input into the neural network, and N representing a quantity of predicted subband spectrum envelopes output from the neural network. In an embodiment, because N<M, where N may be much smaller than M, a relatively large quantity of speech feature parameters (including spectra) may be mapped to a small quantity of parameters based on the network topology structure. Subsequently, the parameters may be used for filtering an input spectrum, thereby achieving a speech signal enhancement effect. Based on the solution provided in this embodiment, during neural network training, because an M-to-N mapping manner rather than an M-to-M mapping manner is used, a quantity of model parameters of the neural network can be effectively reduced. When the neural network is used to perform prediction, processing efficiency can be improved, thereby better meeting a real-time performance requirement for speech communication.

To better describe and understand the speech signal processing solution provided in the embodiments, the solution is further described below in detail with reference to two specific examples.

Figure 5:
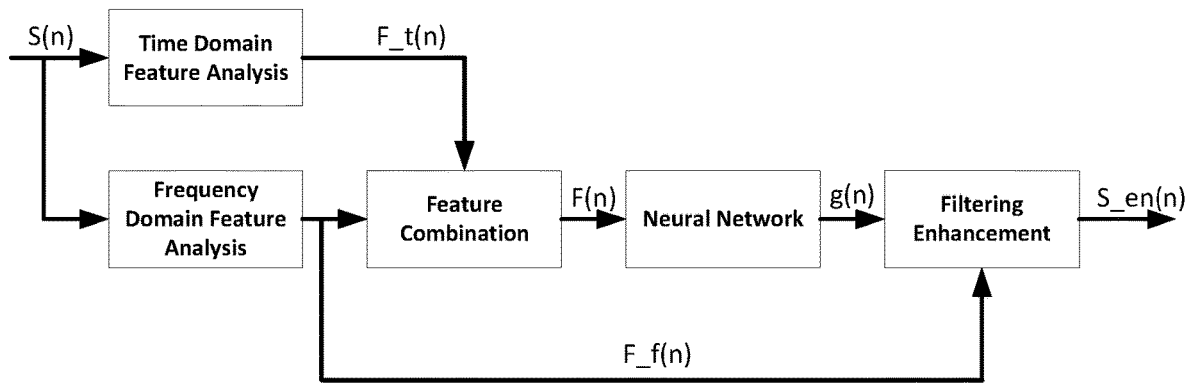
FIG. 5 is a schematic principle diagram of a speech signal processing method according to an embodiment of this disclosure.

FIG. 5 is a schematic principle diagram of a speech signal processing method according to two embodiments of this disclosure. In a speech communication system, processing of speech signals is performed based on frames. Therefore, for speech signals that need to be enhanced, consecutive speech signals are segmented into several frames. Each frame includes sample points of a fixed length inside. During signal enhancement, a speech signal of each speech frame is processed.

As shown in FIG. 5, s(n) represents an input signal of an $n^{th}$ frame, that is, a speech signal of an $n^{th}$ frame in a to-be-enhanced speech signal. Based on the solution provided in the embodiments of this disclosure, a procedure of processing the frame of speech signal may be described specifically as follows.

For the $n^{th}$ frame of speech signal, that is, s(n), time domain feature analysis and frequency domain feature analysis may be separately performed to obtain a time domain feature vector F_t(n) (that is, time domain feature parameters) and a frequency domain feature vector F_f(n) (that is, frequency domain feature parameters, namely, a spectrum). The frequency domain feature vector may include specifically spectrum coefficients.

The obtained time domain feature vector and the obtained frequency domain feature vector are combined, to generate a feature vector F(n) after the combination (that is, speech feature parameters). After F(n) is input into a neural network, a group of parameters g(n) can be predicted.

g(n) is applied to the spectrum coefficients to complete a frequency domain filtering enhancement, to obtain processed spectrum coefficients S_en(n); and subsequently a time-frequency inverse transform is performed on S_en(n) to obtain a time domain signal after the filtering enhancement, that is, an enhanced speech signal.

A detailed description is provided below with reference to two examples.

Example 1 (the Time-Frequency Transform is an STFT in this Example)

For ease of description, a narrowband signal with a sampling rate of Fs=8,000 Hz is used as a to-be-processed speech signal in this example. The solution provided in the embodiments of this disclosure is also applicable to speech signal processing scenarios with other sampling rates. For example, the solution is applicable to scenarios with lower or higher sampling rates. For example, the solution may be applied to an application scenario whose sampling rate may be, but is not limited to, 16,000 Hz, 32,000 HZ, or 48,000 Hz. In this example, assuming that a frame length of one speech frame is 20 ms, when Fs is 8,000 Hz, each frame includes 160 sample points.

The method for performing speech signal processing on s(n) in this example may include the following steps. In the following steps, an order of some steps is not fixed. For example, the time domain feature analysis and the frequency domain feature analysis below may be exchanged in the order or simultaneously performed.

Step 1: Time Domain Feature Analysis

Shift and Bias are selected as LSF parameters of a speech frame. For the $n^{th}$ speech frame s(n), a feature vector of time domain feature parameters may at least include two dimensions Shift(n) and Bias(n). Further, considering that an exemplary speech encoding system divides a speech frame of 20 ms into 2 to 4 subframes, Shift and Bias of a plurality of subframes may be selected from the frame range of 20 ms as the time domain feature parameters. In this example, Shift and Bias of two subframes (which may be any two subframes or two specified subframes) of each frame may be selected. In this case, the time domain feature parameters of the $n^{th}$ frame in this example include a 4-dimensional time domain feature vector, recorded as F_t(n).

Step 2: Frequency Domain Feature Analysis

The time-frequency transform manner in this example is an STFT. In an exemplary application, considering elimination of the discontinuity of inter-frame data, a data cache manner of 50% overlap may be used. Specifically, 160 sample points of a last frame (for example, for the $n^{th}$ frame s(n), the last frame thereof is s(n−1)) and 160 sample points of a current frame may be combined into a large array, and a windowing operation is performed. For example, a Hanning window may be used to perform the windowing operation. During specific processing, spectrum coefficients S(n) of s(n) may be obtained with reference to s(n−1) and s(n) through an STFT. In this example, spectrum coefficients S(n) of previous 161 sample points may be selected as a frequency domain feature vector, recorded as F_f(n).

Step 3: Feature Combination and Neural Network Prediction

After the time domain feature vector and the frequency domain feature vector are obtained, the feature vectors are combined (which may be specifically vector splicing), to obtain a feature vector F(n)={F_t(n), F_f(n)} after the combination. It can be learned from step 1 and step 2 that in this example, F(n) is a 165-dimensional vector. The vector is used as an input of the neural network, and the first quantity of subband spectrum envelopes are predicted by using the neural network.

In this example, the first quantity is set to 16. For spectrum coefficients of the foregoing 161 sample points, considering that there is one direct-current component in an STFT coefficient sequence (generally, the first element is a direct-current component), and the direct-current component may be removed during analysis, 160 spectrum coefficients are considered. When the first quantity is 16, each subband spectrum envelope corresponds to 10 (which is the second quantity in this example) spectrum coefficients. In other words, a spectrum including 160 spectrum coefficients may be divided into 16 spectrum subbands. Each of the spectrum subbands includes 10 spectrum coefficients. Subsequently a respective to-be-processed subband spectrum envelope can be obtained for each spectrum subband based on the spectrum coefficients included in the respective spectrum subband. Each to-be-processed subband spectrum envelope may be represented as:

$$g(n) = \text{eve}(|X(n)|) \quad (8)$$

where X(n) represents previous 161 elements of the STFT coefficient sequence, and eve is a spectrum envelope operator.

During an exemplary processing, the first element in the STFT coefficient sequence may not be considered. Therefore, the eve operator may be invoked based on the next 160 elements of X(n) to calculate spectrum envelope values.

In this example, spectrum envelopes may be specifically spectrum envelopes in a logarithm domain. A specified spectrum envelope calculation manner may be calculating an average value of logarithm representations of 10 adjacent frequency points. In other words, a subband spectrum envelope of a spectrum subband may be calculated based on each 10 adjacent spectrum coefficients. The calculation expression is:

$$g(n) = \frac{\sum_{j=st(n)}^{ed(n)} \log(|X(j)|)}{N} \quad (9)$$

where as described above, N is the second quantity, and is 10 in this example. {st(n),ed(n)} correspondingly represents an index value (such as {1,10} or {11,20}) of a corresponding spectrum coefficient of an $n^{th}$ spectrum subband, and X(j) represents a $i^{th}$ spectrum coefficient in each spectrum subband. Each 10 adjacent spectrum coefficients in the $n^{th}$ subband may be selected as a group for calculation, to obtain each to-be-processed subband spectrum envelope. That is, one to-be-processed subband spectrum envelope is calculated based on each 10 adjacent spectrum coefficients. Therefore, 16 to-be-processed subband spectrum envelopes can be correspondingly obtained based on the 160 spectrum coefficients except the direct-current component.

Similarly, the 165-dimensional vector described above is input into the neural network configured for the subband spectrum envelope prediction, and 16 subband spectrum envelopes can also be predicted by using the neural network. That is, output parameters g(n) of the neural network include 16 elements. In other words, an output of the prediction of the neural network is defined by using a spectrum envelope of a signal spectrum, and a spectrum envelope of an amplitude spectrum of the STFT coefficient sequence, that is, the subband spectrum envelopes, is predicted based on the input time domain feature vector and the input frequency domain feature vector.

Based on the above example, an input of the neural network is 165-dimensional, and an output of the neural network is 16-dimensional. Therefore, considering the input and the output, the neural network used in this embodiment uses a 165-to-16 mapping as parametric regression. Obviously, this manner is much simpler than the related coefficient-to-coefficient regression manner.

For the inside of the neural network, a structure selected in this example is described as follows: (1) a 165-dimensional input layer is connected to an LSTM layer including 256 nodes; (2) the next layer is a fully-connected layer including 512 nodes; and (3) a 16-dimensional output layer follows the fully-connected layer. A task of predicting g(n) is completed by using the structure.

During an exemplary implementation, some training data may be prepared to invoke a neural network toolkit to train parameters inside the neural network. The training data includes to-be-enhanced speech signals to be input into the input layer, and these data may be speech signals that have been compressed by a specified encoder and have quantization distortion. Data related to the output layer is from an original pure speech. Through training, parameters predicted by the neural network can be guided to be infinitely close to spectrum envelopes corresponding to the pure speech.

Step 4: Frequency Domain Filtering Enhancement

This step is a step of completing filtering based on spectrum envelopes g(n) (that is, subband spectrum envelopes) predicted by the neural network, that is, obtaining an enhanced speech signal based on the predicted subband spectrum envelopes.

For a case in which F_f(n) includes previous 161 elements of spectrum coefficients of a to-be-enhanced speech frame, a gain control based on the subband spectra is performed on F_f(n) except the first element (the direct-current component). The gain control can be performed as follows.

(1) For each predicted subband envelope value (that is, subband spectrum envelope), a respective difference value between the respective predicted subband envelope value and a corresponding subband envelope value before processing (that is, a to-be-processed subband spectrum) is calculated in the logarithm domain. In this example, 16 subband spectrum envelopes are predicted, and 16 difference values can be calculated. Each of the difference values corresponds to 10 initial spectrum coefficients.

(2) Each difference value is applied to the corresponding initial spectrum coefficients, to complete the gain control based on the subband spectra, and finally a processed amplitude spectrum is generated. Specifically, for the foregoing 161 spectrum coefficients, except the first direct-current component, the first difference value is applied to the first 10 spectrum coefficients in the 160 spectrum coefficients, for example, separately adding the difference value to the 10 spectrum coefficients. Similarly, each of the 16 difference values is applied to 10 spectrum coefficients corresponding to the respective difference value in this manner, to obtain 16 processed spectrum coefficients, so as to obtain a processed amplitude spectrum.

For an STFT transform, corresponding phase information, that is, a phase spectrum, further needs to be reconstructed. In this example, new phase information may be specifically generated based on initial phase information of the to-be-processed speech signal. A specific generation method is not limited in this embodiment. For example, phase information corresponding to an input speech frame may be directly duplicated as the new phase information.

Subsequently, by combining the new phase spectrum and the processed amplitude spectrum, a new STFT spectrum coefficient can be generated. Finally, an enhanced speech frame can be generated through an inverse STFT.

Example 2 (the Time-Frequency Transform is an MDCT in this Example)

In Example 1, the time-frequency transform of the speech signal is based on an STFT, and according to the classical signal theory, each frequency point after the transform includes amplitude information and phase information. In Example 1, a high-frequency phase may be mapped from a low-frequency phase, and there may be an error. Therefore, Example 2 provides a processing method based on an MDCT. Relative to the STFT, the MDCT uses similar windowing and overlapping, but a generated MDCT coefficient is a real number, which includes more information. In addition, a post-filtering can be completed only by using a correlation between a high-frequency MDCT coefficient and a low-frequency MDCT coefficient and using the M-to-N prediction method provided in the embodiments of this disclosure.

For ease of description, a description is provided in this example still by using a narrowband signal with a sampling rate of Fs=8,000 Hz as a to-be-processed speech signal as an example. Similarly, the solution provided in this example is also applicable to signal processing scenarios with other sampling rates. For example, the solution is applicable to a scenario with a lower or higher sampling rate, for example, an application scenario with a sampling rate of 16,000 Hz, 32,000 HZ, or 48,000 Hz.

Assuming that a frame length of each frame of speech signal is 20 ms, for an application scenario of Fs=8,000 Hz, each frame includes 160 sample points. The method for performing speech signal processing on s(n) in this example may include the following steps (similarly, an order of some of the following steps is not fixed).

Step 1: Time Domain Feature Analysis

A principle of specific implementation of this step is the same as the principle of step 1 in Example 1, and details are not described herein again. A time domain feature vector F_t(n), for example, a 4-dimensional time domain feature vector, can be obtained through this step.

Step 2: Frequency Domain Feature Analysis

The time-frequency transform used in this example is an MDCT. Particularly, considering elimination of the discontinuity of inter-frame data, a data cache manner of 50% overlap may be generally used. Specifically, for a current frame, 160 sample points of a last frame and 160 sample points of the current frame may be combined into a large array, and a windowing operation is performed. In this example, for the $n^{th}$ speech frame s(n), spectrum coefficients S(n) may be specifically obtained through an MDCT with reference to s(n−1) and s(n). In this example, spectrum coefficients S(n) of previous 161 sample points may be selected as a frequency domain feature vector F_f(n).

Step 3: Feature Combination and Neural Network Prediction

In this step, the time domain feature vector and the frequency domain feature vector are combined, to obtain a feature vector F(n)={F_t(n), F_f(n)} after the combination. In this example, the time domain feature vector and the frequency domain feature vector are spliced, and an obtain spliced vector F(n) is a 165-dimensional vector, which is used as an input of the neural network.

In this example, a processing manner that is the same as that in Example 1 may also be used, to input the 165-dimensional vector into the neural network. For an output of prediction of the neural network, a spectrum envelope of a signal spectrum is used as a definition. For the $n^{th}$ speech frame, a 16-dimensional output vector g(n) is predicted by using the neural network. 16 elements included in the output vector are 16 predicted subband spectrum envelopes (which may be referred to as predicted subband envelope values for short) of the speech frame. Similarly, for 161 MDCT coefficients, except the first direct-current component, envelope values of 16 to-be-processed subband spectrum envelopes (which may be referred to as subband envelope values before processing for short) may be obtained based on the other 160 MDCT coefficients by using expression (8) and expression (9) in Example 1.

The neural network may use the same network structure as that in Example 1. That is, a 165-dimensional input vector is input into an input layer, the input layer being connected to an LSTM layer including 256 nodes; subsequently, a feature vector output by the LSTM layer is input into a fully-connected layer including 512 nodes; and a 16-dimensional output layer follows the fully-connected layer. A task of predicting g(n) is completed by using this structure.

Step 4: Frequency Domain Filtering Enhancement

This step is a process of completing filtering enhancement based on spectrum envelopes g(n) predicted by the neural network to obtain an enhanced speech signal.

For a case in which F_f(n) is previous 161 elements of spectrum coefficients of a to-be-enhanced speech frame, a gain control based on the subband spectra is performed on F_f(n) except the first element (the direct-current component) The gain control can be described as follows.

(1) For each predicted subband envelope value (that is, subband spectrum envelope), a respective difference value between the respective predicted subband envelope value and a corresponding subband envelope value before processing (that is, a to-be-processed subband spectrum) is calculated in the logarithm domain. In this example, 16 difference values can be calculated.

(2) The difference values are respectively applied to corresponding to-be-processed subband spectra, to complete the gain control based on the subband spectra, to obtain a new MDCT spectrum. Specifically, each of the 16 difference values is applied to 16 MDCT coefficients corresponding to the respective difference value, to obtain processed MDCT coefficients.

Finally, an enhanced speech frame can be generated based on the newly generated MDCT spectrum through an inverse MDCT.

In the foregoing two examples provided in this disclosure, time domain feature analysis and frequency domain feature analysis are respectively performed on an input signal, to obtain a time domain feature vector and a frequency domain feature vector; the time domain feature vector and the frequency domain feature vector are combined and input into a neural network, and then a group of parameters can be predicted; subsequently, the predicted parameters are applied to spectrum coefficients to complete a filtering enhancement; and finally, after a time-frequency inverse transform is performed, a time domain signal after the filtering enhancement is generated and output. After the post-filtering enhancement, the quality of the speech signal can be effectively improved, especially distortion such as quantization noise of the speech signal is significantly reduced.

The speech signal processing method provided in the embodiments of this disclosure is applicable to any application scenario in which speech signal enhancement needs to be performed. The method may be applied to offline application scenarios. For example, signal enhancement may be performed, by using the method, on speech signals acquired by a user by using a mobile phone or other speech recording devices of the user or speech signals downloaded from a network. The method may also be applied to online application scenarios, for example, online voice call scenarios or audio and video call scenarios, to perform signal enhancement on speech signals that need to be transmitted in the scenarios. For an online scenario, a node configured to perform the method may be selected according to application needs. For example, in the three speech signal transmission scenarios shown in FIG. 1 to FIG. 3 above, the method may be performed by a client that sends a speech signal, or may be performed by a client that receives a speech signal, or may be performed by a mixing server.

To better describe the method provided in the embodiments of this disclosure, the method is further described below with reference to a specific application scenario example.

Figure 6:
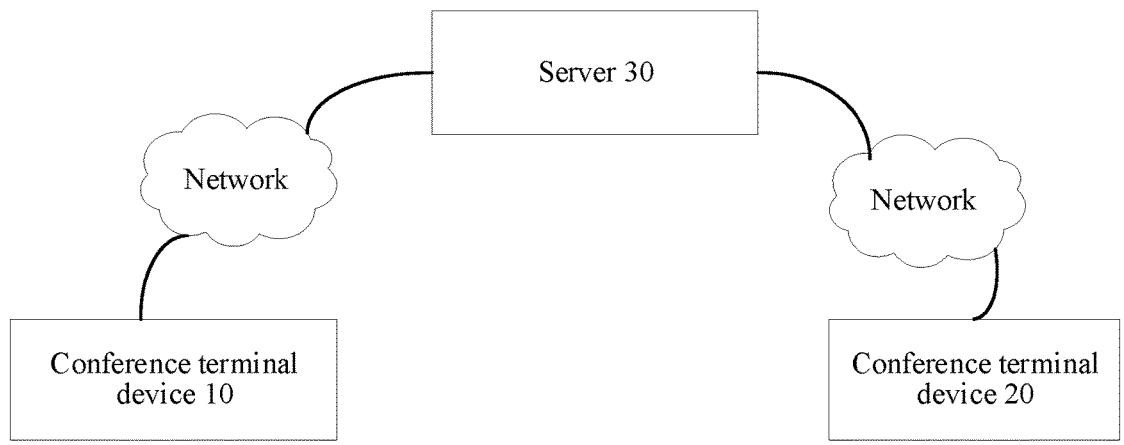
FIG. 6 is a schematic structural diagram of a remote teleconference system according to an embodiment of this disclosure.

FIG. 6 is a schematic structural diagram of a remote teleconference system in this example. As shown in FIG. 6, the remote teleconference system may include a conference terminal device 10 and a conference terminal device 20. The conference terminal device 10 is communicatively connected to the conference terminal device 20 through a server 30. As shown in FIG. 6, the conference terminal device 10 and the conference terminal device 20 are respectively communicatively connected to the server 30 through a network. The conference terminal device 10 and the conference terminal device 20 may be specifically mobile phones, computers, other dedicated conference call apparatuses, or the like. It may be understood that in an exemplary application, there may be two or more parties participating in a conference call.

The remote teleconference system shown in FIG. 6 is described below with reference to a specific application scenario. In the example, an example in which a receiving end of a speech signal performs speech signal enhancement is used.

When a conference is initiated, the conference terminal device 10 and the conference terminal device 20 are connected through the server 30. For example, both the conference terminal device 10 and the conference terminal device 20 are smartphones. A participant A of a first party (a party corresponding to the device 10) participating in the conference may initiate, by using a smartphone, a communication request to a smartphone of a participant B of a second party (a party corresponding to the device 20) participating in the conference, and after the participant B accepts the request, the two parties of the conference establish communication.

In a process of a voice conference after communication is successfully established, a voice session of one or more participants of the first party participating in the conference may be acquired by an audio acquisition module (for example, a microphone) of the conference terminal device 10 and speech encoding is performed on the acquired voice session, and then the encoded voice session is sent to the conference terminal device 20 through the server 30. The conference terminal device 20 decodes a received speech signal, and may use the speech signal processing method provided in the embodiments of this disclosure to enhance the decoded speech signal, to obtain an enhanced speech signal, and play the enhanced speech signal to participants of the second party participating in the conference by using an audio playback device (for example, a speaker). Specifically, after receiving a code stream sent from the server 30, the conference terminal device 20 may decode the code stream to obtain an initial speech signal. The initial speech signal is the to-be-processed speech signal in this example. The conference terminal device 20 may process the speech signal by performing the speech signal processing method according to any one of the embodiments of this disclosure, to obtain an enhanced speech signal. For example, speech feature parameters of the speech signal may be first determined, subband spectrum envelopes are predicted based on the determined speech feature parameters by using a neural network model, initial spectrum coefficients of the speech signal are adjusted by using the predicted subband spectrum envelopes, and an enhanced speech signal can be obtained based on the adjusted spectrum coefficients.

Similarly, a voice session of participants of the second party participating in the conference may be acquired by an audio acquisition module of the conference terminal device 20 and speech encoding is performed on the acquired voice session, and then the encoded voice session is sent to the conference terminal device 10 through the server 30. The conference terminal device 10 decodes a received speech signal, uses the speech signal processing method provided in the embodiments of this disclosure to perform speech signal enhancement on the decoded speech signal, and then plays the enhanced speech signal to the participants of the first party participating in the conference, thereby effectively improving the quality of speech signals heard by the participants of the two parties in the conference.

Figure 7:
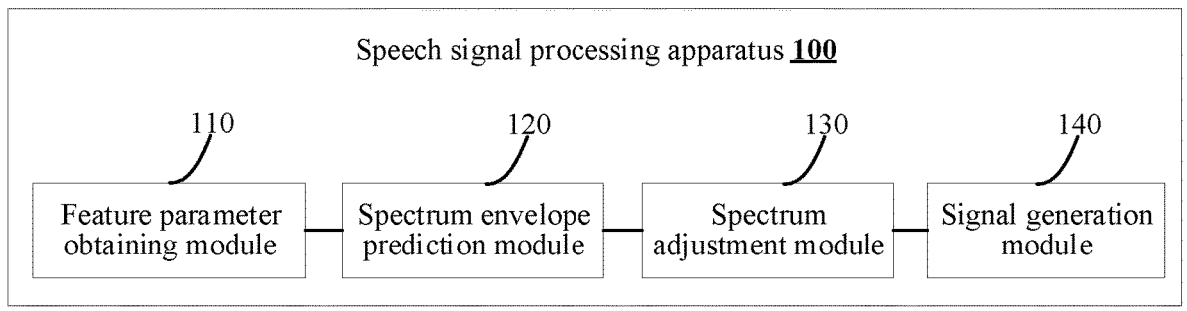
FIG. 7 is a schematic structural diagram of a speech signal processing apparatus according to an embodiment of this disclosure.

Based on the same principle of the speech signal processing method provided in the embodiments of this disclosure, the embodiments of this disclosure further provide a speech signal processing apparatus. As shown in FIG. 7, the speech signal processing apparatus 100 may include a feature parameter obtaining module 110, a spectrum envelope prediction module 120, a spectrum adjustment module 130, and a signal generation module 140. One or more modules of the apparatus 100 can be implemented by processing circuitry, software, or a combination thereof, for example.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The feature parameter obtaining module 110 is configured to obtain speech feature parameters of a to-be-processed speech signal. The speech feature parameters include an initial spectrum of the to-be-processed speech signal.

The spectrum envelope prediction module 120 is configured to predict a first quantity of subband spectrum envelopes based on the speech feature parameters. The first quantity is less than a quantity of initial spectrum coefficients included in the initial spectrum, and each of the subband spectrum envelopes corresponds to a second quantity of initial spectrum coefficients.

The spectrum adjustment module 130 is configured to adjust the initial spectrum based on the predicted subband spectrum envelopes to obtain an adjusted spectrum.

The signal generation module 140 is configured to obtain an enhanced speech signal corresponding to the to-be-processed speech signal based on the adjusted spectrum.

In an embodiment, the speech feature parameters further include time domain feature parameters of the to-be-processed speech signal.

In an embodiment, the time domain feature parameters include an LSF parameter.

In an embodiment, the to-be-processed speech signal is a speech signal of a current speech frame of multiple speech frames of a to-be-enhanced speech signal, and the LSF parameter of the current speech frame includes at least one of the following parameters:
  (i) an angular frequency shift of the current speech frame relative to an adjacent speech frame of the current speech frame;
  (ii) an average angular frequency of the current speech frame; or
  (iii) a deviation of an angular frequency distribution of the current speech frame relative to a reference angular frequency distribution.

In an embodiment, for the current speech frame, the LSF parameter includes the angular frequency shift of the current speech frame relative to the adjacent speech frame of the current speech frame and the average angular frequency of the current speech frame, or includes the angular frequency shift of the current speech frame relative to the adjacent speech frame of the current speech frame and a deviation of the angular frequency distribution of the current speech frame relative to the reference angular frequency distribution.

In an embodiment, each speech frame includes at least two subframes, and for one speech frame, an LSF parameter of the speech frame include an LSF parameter of at least one subframe included in the speech frame.

In an embodiment, the spectrum adjustment module 130 is configured to: (i) divide the initial spectrum into a first quantity of spectrum subbands, each of the spectrum subbands including the second quantity of initial spectrum coefficients in the initial spectrum; (ii) obtain a respective to-be-processed subband spectrum envelope for each spectrum subband based on the initial spectrum coefficients included in the respective spectrum subband; (iii) determine a respective difference value for each of the predicted subband spectrum envelopes between the respective predicted subband spectrum envelope and a corresponding to-be-processed subband spectrum envelope; and (iv) adjust the initial spectrum coefficients for each to-be-processed subband spectrum envelope based on the difference value corresponding to the respective to-be-processed subband spectrum envelope, to obtain the adjusted spectrum.

In an embodiment, both the predicted subband spectrum envelopes and the to-be-processed subband spectrum envelopes are envelopes in a logarithm domain, and for one to-be-processed subband spectrum envelope, when the spectrum adjustment module 130 adjusts the initial spectrum coefficients corresponding to the to-be-processed subband spectrum envelope based on the difference value corresponding to the to-be-processed subband spectrum envelope, the spectrum adjustment module 130 is configured to: (i) respectively perform a logarithmic transformation on each of the initial spectrum coefficients corresponding to the to-be-processed subband spectrum envelope, to obtain coefficients in the logarithm domain; (ii) respectively perform a gain adjustment on each of the coefficients in the logarithm domain based on the difference value corresponding to the to-be-processed subband spectrum envelope, to obtain adjusted coefficients; and (iii) respectively perform an inverse logarithmic transformation on each of the adjusted coefficients, to obtain adjusted spectrum coefficients corresponding to the to-be-processed subband spectrum envelope.

In an embodiment, the feature parameter obtaining module 110 is configured to perform a time-frequency transform on the to-be-processed speech signal to obtain the initial spectrum.

When the time-frequency transform is an FT, the initial spectrum is an initial amplitude spectrum, the predicted subband spectrum envelopes are subband amplitude spectrum envelopes, the spectrum adjustment module 130 is configured to adjust the initial amplitude spectrum based on the predicted subband amplitude spectrum envelopes to obtain an adjusted amplitude spectrum, and the signal generation module 140 is configured to: obtain a target phase spectrum based on an initial phase spectrum of the to-be-processed speech signal, and perform a time-frequency inverse transform based on the adjusted amplitude spectrum and the target phase spectrum to obtain an enhanced speech signal.

When the time-frequency transform is a DCT, the signal generation module 140 is configured to perform a time-frequency inverse transform on the adjusted spectrum, to obtain an enhanced speech signal.

In an embodiment, the spectrum envelope prediction module 120 is specifically configured to predict the first quantity of subband spectrum envelopes based on the speech feature parameters by using a neural network. The neural network is obtained by a neural network training module in the following training process.

The training process obtains training data. The training data includes multiple to-be-enhanced sample speech signals and multiple pure speech signals. Each pure speech signal corresponds to a different to-be-enhanced sample speech signal.

The training process obtains sample subband spectrum envelopes for each to-be-enhanced sample speech signal based on the pure speech signal corresponding to the respective to-be-enhanced sample speech signal.

The training process determines speech feature parameters of each sample speech signal.

The training process trains an initial neural network based on each to-be-enhanced sample speech signal until a loss function of the initial neural network converges, an input of the initial neural network being the speech feature parameters of each sample speech signal, and an output of the initial neural network being predicted subband spectrum envelopes corresponding to each sample speech signal, and a value of the loss function representing a difference between the predicted subband spectrum envelopes corresponding to each sample speech signal and the corresponding sample subband spectrum envelopes.

In an embodiment, for one pure speech signal, when the neural network training module obtains sample subband spectrum envelopes of a sample speech signal corresponding to the pure speech signal based on the pure speech signal, the neural network training module is specifically configured to: (i) perform a time-frequency transform on the pure speech signal to obtain an initial spectrum of the pure speech signal; (ii) divide the initial spectrum of the pure speech signal into a first quantity of spectrum subbands, each of the spectrum subbands including a second quantity of spectrum coefficients in the initial spectrum; and (iii) obtain a respective sample subband spectrum envelope for each spectrum subband based on the spectrum coefficients included in the respective spectrum subband.

In an embodiment, the neural network includes an input layer, a hidden layer, and an output layer that are sequentially cascaded, the hidden layer includes an LSTM layer and a fully-connected layer that are sequentially cascaded, an input of the input layer is a first feature vector of the speech feature parameters, the LSTM layer is configured to perform a feature extraction on the first feature vector processed by the input layer to generate a second feature vector, the fully-connected layer is configured to perform the feature extraction on the second feature vector extracted from the LSTM layer to generate a third feature vector, the output layer is configured to obtain an output vector with the first quantity of dimensions based on the third feature vector extracted by the fully-connected layer, and element values of elements in the output vector are the predicted subband spectrum envelopes.

The apparatus provided in the embodiments of this disclosure is an apparatus that may perform the method in the embodiments of this disclosure. Therefore, based on the method provided in the embodiments of this disclosure, a person skilled in the art can learn specific implementations of the apparatus in the embodiments of this disclosure and various variations thereof, and a manner in which the apparatus implements the method in the embodiments of this disclosure is not described in detail herein. All apparatuses used when a person skilled in the art implements the method in the embodiments of this disclosure shall fall within the protection scope of this disclosure.

Based on the same principle of the speech signal processing method and apparatus provided in the embodiments of this disclosure, the embodiments of this disclosure further provide an electronic device including a memory and a processor. The memory is configured to store a computer program, and the processor is configured to, when executing the computer program stored in the memory, perform the speech signal processing method illustrated in any one of the embodiments of this disclosure.

The embodiments of this disclosure further provide a computer-readable storage medium (e.g., a non-transitory computer-readable storage medium) storing a computer program. The computer program, when executed by a processor, implements the speech signal processing method illustrated in any one of the embodiments of this disclosure.

Figure 8:
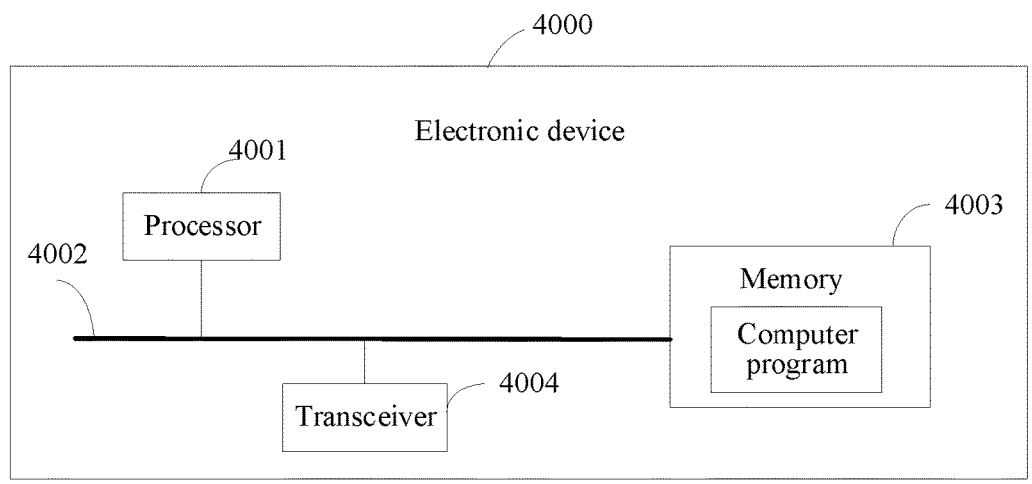
FIG. 8 is a schematic structural diagram of an electronic device according to an embodiment of this disclosure.

In an embodiment, FIG. 8 is a schematic structural diagram of an electronic device according to an embodiment of this disclosure. As shown in FIG. 8, the electronic device 4000 includes a processor 4001 and a memory 4003. The processor 4001 and the memory 4003 are connected, for example, are connected by a bus 4002. In an embodiment, the electronic device 4000 may further include a transceiver 4004. In an exemplary application, there may be one or more transceivers 4004. The structure of the electronic device 4000 does not constitute a limitation on this embodiment.

The processor 4001 may be processing circuitry such as a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or perform various examples of logic blocks, modules, and circuits described with reference to content disclosed in this disclosure. The processor 4001 may be alternatively a combination to implement a computing function, for example, may be a combination of one or more microprocessors, or a combination of a DSP and a microprocessor.

The bus 4002 may include a channel, to transmit information between the foregoing components. The bus system 4002 may be a peripheral component interconnect (PCI) bus, an extended industry standard architecture (EISA) bus, or the like. The bus 4002 may be classified into an address bus, a data bus, a control bus, and the like. For ease of description, the bus in FIG. 8 is represented by using only one bold line, but it does not indicate that there is only one bus or one type of bus.

The memory 4003 may be a volatile or non-volatile computer-readable storage medium, such as a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, a Blu-ray disc, or the like), a disk storage medium or another magnetic storage device, or any other medium that can be used to carry or store expected program code in a command or data structure form and that can be accessed by a computer, but is not limited thereto.

The memory 4003 is configured to store application program code for performing the solutions of the embodiments of this disclosure, and is controlled and executed by the processor 4001. The processor 4001 is configured to execute the application program code stored in the memory 4003 to implement the content shown in any one of the foregoing method embodiments.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of sub steps or a plurality of stages. The sub steps or the stages are not necessarily performed at the same moment, but may be performed at different moments. The substeps or the stages are not necessarily performed in sequence, but may be performed in turn or alternately with another step or at least some of sub steps or stages of the another step.

The foregoing descriptions are some implementations of this disclosure. A person of ordinary skill in the art may make several improvements and refinements without departing from the principle of this disclosure, and the improvements and refinements shall fall within the protection scope of this disclosure.

What is claimed is:

1. A speech signal processing method, comprising:
obtaining speech feature parameters of a to-be-processed speech signal, the speech feature parameters including an initial spectrum of the to-be-processed speech signal;
predicting, by processing circuitry of an electronic device, a first quantity of subband spectrum envelopes based on the speech feature parameters, the first quantity being less than a quantity of initial spectrum coefficients included in the initial spectrum, and each of the subband spectrum envelopes corresponding to a second quantity of initial spectrum coefficients;
dividing the initial spectrum into a first quantity of spectrum subbands, each of the spectrum subbands including the second quantity of initial spectrum coefficients in the initial spectrum;
obtaining a respective to-be-processed subband spectrum envelope for each spectrum subband based on the initial spectrum coefficients included in the respective spectrum subband;
determining a respective difference value for each of the predicted subband spectrum envelopes between the respective predicted subband spectrum envelope and a corresponding to-be-processed subband spectrum envelope;
adjusting the initial spectrum coefficients for each to-be-processed subband spectrum envelope, based on the difference value corresponding to the respective to-be-processed subband spectrum envelope, to obtain an adjusted spectrum; and
obtaining an enhanced speech signal corresponding to the to-be-processed speech signal based on the adjusted spectrum.

2. The method according to claim 1, wherein the speech feature parameters further include time domain feature parameters of the to-be-processed speech signal.

3. The method according to claim 2, wherein the time domain feature parameters include a line spectral frequency (LSF) parameter.

4. The method according to claim 3, wherein the to-be-processed speech signal is of a current speech frame of multiple speech frames of a to-be-enhanced speech signal, and the LSF parameter of the current speech frame includes at least one of (i) an angular frequency shift of the current speech frame relative to an adjacent speech frame of the current speech frame, (ii) an average angular frequency of the current speech frame, or (iii) a deviation of an angular frequency distribution of the current speech frame relative to a reference angular frequency distribution.

5. The method according to claim 4, wherein each of the multiple speech frames includes at least two subframes, and the LSF parameter of each speech frame includes the LSF parameter of at least one subframe included in the respective speech frame.

6. The method according to claim 1, wherein both the predicted subband spectrum envelopes and the to-be-processed subband spectrum envelopes are in a logarithm domain, and for one to-be-processed subband spectrum envelope, the adjusting the initial spectrum coefficients comprises:
respectively performing a logarithmic transformation on each of the initial spectrum coefficients corresponding to the to-be-processed subband spectrum envelope, to obtain coefficients in the logarithm domain;
respectively performing a gain adjustment on each of the coefficients in the logarithm domain based on the difference value corresponding to the to-be-processed subband spectrum envelope, to obtain adjusted coefficients; and
respectively performing an inverse logarithmic transformation on each of the adjusted coefficients, to obtain adjusted spectrum coefficients corresponding to the to-be-processed subband spectrum envelope.

7. The method according to claim 1, wherein the obtaining the speech feature parameters comprises:
performing a time-frequency transform on the to-be-processed speech signal to obtain the initial spectrum, wherein
when the time-frequency transform is a Fourier transform (FT),
the initial spectrum is an initial amplitude spectrum,
the predicted subband spectrum envelopes are subband amplitude spectrum envelopes,
the adjusting the initial spectrum based on the predicted subband spectrum envelopes to obtain the adjusted spectrum includes
adjusting the initial amplitude spectrum based on the predicted subband amplitude spectrum envelopes to obtain an adjusted amplitude spectrum, and
the obtaining the enhanced speech signal includes
obtaining a target phase spectrum based on an initial phase spectrum of the to-be-processed speech signal, and
performing a time-frequency inverse transform based on the adjusted amplitude spectrum and the target phase spectrum to obtain the enhanced speech signal; and
when the time-frequency transform is a discrete cosine transform (DCT),
the obtaining the enhanced speech signal includes
performing the time-frequency inverse transform on the adjusted spectrum, to obtain the enhanced speech signal.

8. The method according to claim 1, wherein the predicting comprises:
predicting the first quantity of subband spectrum envelopes based on the speech feature parameters by using a neural network,
wherein the neural network is obtained through a training process that includes:
obtaining training data, the training data comprising multiple to-be-enhanced sample speech signals and multiple pure speech signals, each pure speech signal corresponding to a different to-be-enhanced sample speech signal;
obtaining sample subband spectrum envelopes for each to-be-enhanced sample speech signal based on the pure speech signal corresponding to the respective to-be-enhanced sample speech signal;
determining speech feature parameters of each to-be-enhanced sample speech signal; and
training an initial neural network based on each to-be-enhanced sample speech signal until a loss function of the initial neural network converges, an input of the initial neural network being the speech feature parameters of each to-be-enhanced sample speech signal, an output of the initial neural network being predicted subband spectrum envelopes corresponding to each to-be-enhanced sample speech signal, and a value of the loss function representing a difference between the predicted subband spectrum envelopes corresponding to each to-be-enhanced sample speech signal and the corresponding sample subband spectrum envelopes.

9. The method according to claim 8, wherein for one pure speech signal, the obtaining the sample subband spectrum envelopes comprises:
performing a time-frequency transform on the pure speech signal to obtain an initial spectrum of the pure speech signal;
dividing the initial spectrum of the pure speech signal into a first quantity of spectrum subbands, each of the spectrum subbands including a second quantity of spectrum coefficients in the initial spectrum; and
obtaining a respective sample subband spectrum envelope for each spectrum subband based on the spectrum coefficients included in the respective spectrum subband to obtain the sample subband spectrum envelopes for the respective to-be-enhanced sample speech signal corresponding to the pure speech signal.

10. The method according to claim 8, wherein the neural network comprises an input layer, a hidden layer, and an output layer that are sequentially cascaded,
the hidden layer comprising a long short-term memory (LSTM) layer and a fully-connected layer that are sequentially cascaded,
an input of the input layer being a first feature vector of the speech feature parameters,
the LSTM layer being configured to perform a feature extraction on the first feature vector processed by the input layer to generate a second feature vector,
the fully-connected layer being configured to perform the feature extraction on the second feature vector generated by the LSTM layer to generate a third feature vector, and
the output layer being configured to obtain an output vector with a first quantity of dimensions based on the third feature vector generated by the fully-connected layer, element values of elements in the output vector being the predicted subband spectrum envelopes.

11. A speech signal processing apparatus, comprising: processing circuitry configured to:
obtain speech feature parameters of a to-be-processed speech signal, the speech feature parameters including an initial spectrum of the to-be-processed speech signal;
predict a first quantity of subband spectrum envelopes based on the speech feature parameters, the first quantity being less than a quantity of initial spectrum coefficients included in the initial spectrum, and each of the subband spectrum envelopes corresponding to a second quantity of initial spectrum coefficients;
divide the initial spectrum into a first quantity of spectrum subbands, each of the spectrum subbands including the second quantity of initial spectrum coefficients in the initial spectrum;
obtain a respective to-be-processed subband spectrum envelope for each spectrum subband based on the initial spectrum coefficients included in the respective spectrum subband;
determine a respective difference value for each of the predicted subband spectrum envelopes between the respective predicted subband spectrum envelope and a corresponding to-be-processed subband spectrum envelope;
adjust the initial spectrum coefficients for each to-be-processed subband spectrum envelope, based on the difference value corresponding to the respective to-be-processed subband spectrum envelope, to obtain an adjusted spectrum; and
obtain an enhanced speech signal corresponding to the to-be-processed speech signal based on the adjusted spectrum.

12. The apparatus according to claim 11, wherein the speech feature parameters further include time domain feature parameters of the to-be-processed speech signal.

13. The apparatus according to claim 11, wherein both the predicted subband spectrum envelopes and the to-be-processed subband spectrum envelopes are in a logarithm domain, and for one to-be-processed subband spectrum envelope, the processing circuitry is configured to:
respectively perform a logarithmic transformation on each of the initial spectrum coefficients corresponding to the to-be-processed subband spectrum envelope, to obtain coefficients in the logarithm domain;
respectively perform a gain adjustment on each of the coefficients in the logarithm domain based on the difference value corresponding to the to-be-processed subband spectrum envelope, to obtain adjusted coefficients; and
respectively perform an inverse logarithmic transformation on each of the adjusted coefficients, to obtain adjusted spectrum coefficients corresponding to the to-be-processed subband spectrum envelope.

14. The apparatus according to claim 11, wherein the processing circuitry is configured to:
perform a time-frequency transform on the to-be-processed speech signal to obtain the initial spectrum, wherein
when the time-frequency transform is a Fourier transform (FT),
the initial spectrum is an initial amplitude spectrum,
the predicted subband spectrum envelopes are subband amplitude spectrum envelopes,
the processing circuitry is configured to
adjust the initial amplitude spectrum based on the predicted subband amplitude spectrum envelopes to obtain an adjusted amplitude spectrum,
obtain a target phase spectrum based on an initial phase spectrum of the to-be-processed speech signal, and
perform a time-frequency inverse transform based on the adjusted amplitude spectrum and the target phase spectrum to obtain the enhanced speech signal; and
when the time-frequency transform is a discrete cosine transform (DCT), a time-frequency inverse transform is performed on the adjusted spectrum, to obtain the enhanced speech signal.

15. The apparatus according to claim 11, wherein the processing circuitry is configured to:
predict the first quantity of subband spectrum envelopes based on the speech feature parameters by using a neural network, wherein the neural network is obtained through a training process that includes:
  obtaining training data, the training data comprising multiple to-be-enhanced sample speech signals and multiple pure speech signals, each pure speech signal corresponding to a different to-be-enhanced sample speech signal;
  obtaining sample subband spectrum envelopes for each to-be-enhanced sample speech signal based on the pure speech signal corresponding to the respective to-be-enhanced sample speech signal;
  determining speech feature parameters of each to-be-enhanced sample speech signal; and
  training an initial neural network based on each to-be-enhanced sample speech signal until a loss function of the initial neural network converges, an input of the initial neural network being the speech feature parameters of each to-be-enhanced sample speech signal, an output of the initial neural network being predicted subband spectrum envelopes corresponding to each to-be-enhanced sample speech signal, and a value of the loss function representing a difference between the predicted subband spectrum envelopes corresponding to each to-be-enhanced sample speech signal and the corresponding sample subband spectrum envelopes.

16. The apparatus according to claim 15, wherein for one pure speech signal, the obtaining the sample subband spectrum envelopes comprises:
  performing a time-frequency transform on the pure speech signal to obtain an initial spectrum of the pure speech signal;
  dividing the initial spectrum of the pure speech signal into a first quantity of spectrum subbands, each of the spectrum subbands including a second set quantity of spectrum coefficients in the initial spectrum; and
  obtaining a respective sample subband spectrum envelope for each spectrum subband based on the spectrum coefficients included in the respective spectrum subband to obtain the sample subband spectrum envelopes for the respective to-be-enhanced sample speech signal corresponding to the pure speech signal.

17. The apparatus according to claim 15, wherein the neural network comprises an input layer, a hidden layer, and an output layer that are sequentially cascaded,
  the hidden layer comprising a long short-term memory (LSTM) layer and a fully-connected layer that are sequentially cascaded,
  an input of the input layer being a first feature vector of the speech feature parameters,
  the LSTM layer being configured to perform a feature extraction on the first feature vector processed by the input layer to generate a second feature vector,
  the fully-connected layer being configured to perform the feature extraction on the second feature vector generated by the LSTM layer to generate a third feature vector, and
  the output layer being configured to obtain an output vector with a first quantity of dimensions based on the third feature vector generated by the fully-connected layer, element values of elements in the output vector being the predicted subband spectrum envelopes.

18. A non-transitory computer-readable storage medium storing instructions, which when executed by at least one processor cause the at least one processor to perform:
  obtaining speech feature parameters of a to-be-processed speech signal, the speech feature parameters including an initial spectrum of the to-be-processed speech signal;
  predicting a first quantity of subband spectrum envelopes based on the speech feature parameters, the first quantity being less than a quantity of initial spectrum coefficients included in the initial spectrum, and each of the subband spectrum envelopes corresponding to a second quantity of initial spectrum coefficients;
  dividing the initial spectrum into a first quantity of spectrum subbands, each of the spectrum subbands including the second quantity of initial spectrum coefficients in the initial spectrum;
  obtaining a respective to-be-processed subband spectrum envelope for each spectrum subband based on the initial spectrum coefficients included in the respective spectrum subband;
  determining a respective difference value for each of the predicted subband spectrum envelopes between the respective predicted subband spectrum envelope and a corresponding to-be-processed subband spectrum envelope;
  adjusting the initial spectrum coefficients for each to-be-processed subband spectrum envelope, based on the difference value corresponding to the respective to-be-processed subband spectrum envelope, to obtain an adjusted spectrum; and
  obtaining an enhanced speech signal corresponding to the to-be-processed speech signal based on the adjusted spectrum.

* * * * *